(12) United States Patent
Mantani

(10) Patent No.: US 7,028,211 B2
(45) Date of Patent: Apr. 11, 2006

(54) METHOD AND APPARATUS FOR DETERMINING A SYSTEM CLOCK FREQUENCY BY SUMMING CALCULATED CPU USAGE RATES FOR EACH OF A PLURALITY APPLICATIONS

(75) Inventor: Tadashi Mantani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 10/383,228

(22) Filed: Mar. 7, 2003

(65) Prior Publication Data

US 2003/0226049 A1  Dec. 4, 2003

Related U.S. Application Data

(63) Continuation of application No. PCT/JP00/06169, filed on Sep. 8, 2000.

(51) Int. Cl.
  G06F 1/04 (2006.01)
  G06F 1/08 (2006.01)
  G06F 1/26 (2006.01)

(52) U.S. Cl. .................. 713/600; 713/300; 713/500

(58) Field of Classification Search .............. 713/300, 713/500, 600
See application file for complete search history.

(56) References Cited

U.S. PATENT DOCUMENTS

| 5,600,228 | A |   | 2/1997 | Matsubayashi et al. |
| 5,774,704 | A | * | 6/1998 | Williams ............ 713/501 |
| 5,958,058 | A | * | 9/1999 | Barrus ................ 713/320 |

FOREIGN PATENT DOCUMENTS

| EP | 0 636 897 A1 |   | 2/1995 |
| EP | 0 794 481 A2 |   | 9/1997 |
| EP | 794481 A2 | * | 9/1997 |
| JP | 64-23317 |   | 1/1989 |
| JP | 04363752 A | * | 12/1992 |
| JP | 5-94228 |   | 4/1993 |
| JP | 7-44281 |   | 2/1995 |
| JP | 8-76874 |   | 3/1996 |
| JP | 6-190244 |   | 7/1997 |
| JP | 9-237132 |   | 9/1997 |
| JP | 10-222256 |   | 8/1998 |
| JP | 11-65712 |   | 3/1999 |
| JP | 11-237931 |   | 8/1999 |
| JP | 2000-122747 |   | 4/2000 |
| JP | 2000-222061 |   | 8/2000 |

* cited by examiner

*Primary Examiner*—Thomas Lee
*Assistant Examiner*—Mark Connolly
(74) *Attorney, Agent, or Firm*—Staas & Halsey LLP

(57) ABSTRACT

In the clock control of the present invention, CPU usage rate is calculated for each of a plurality of applications with respect to a maximum clock frequency attainable by the information processing apparatus, based on registered clock frequency necessary for executing each of the applications, and a system clock frequency determined by a total sum of the CPU usage rates is set in the apparatus. If the frequency with which this system clock frequency exceeds the maximum clock frequency increases, an apparatus upgrade necessity alarm is sent. Also, any one clock frequency from among a comfortable operation clock frequency for the application, a minimum clock frequency for the application to run, and a permissible system clock frequency corresponding to usage environmental conditions (power source state, temperature and noise) is set according to the usage environmental conditions. Thereby, optimum performance of the apparatus can be provided.

42 Claims, 15 Drawing Sheets

Fig.2

FIRST MANAGEMENT TABLE

| APPLICATION NAME | OPTIMUM OPERATION CLOCK | CPU USAGE RATE |
|---|---|---|
| AP1 | 30MHz | 10% |
| AP2 | 60MHz | 20% |
| RESOURCE MANAGEMENT | 30MHz | 10% |
| TOTAL | | 40% |

Fig.6

| APPLICATION NAME | OPTIMUM OPERATION CLOCK | MINIMUM OPERATION CLOCK | CPU USAGE RATE | |
|---|---|---|---|---|
| | | | OPTIMUM OPERATION | MINIMUM OPERATION |
| AP1 | 30MHz | 10MHz | 10% | 3.3% |
| AP2 | 60MHz | 20MHz | 20% | 6.6% |
| RESOURCE MANAGEMENT | 30MHz | 10MHz | 10% | 3.3% |
| TOTAL | | | 40% | 13.3% |

Fig.13

THIRD MANAGEMENT TABLE

| EXTERNAL NOISE | PERMISSIBLE CPU CLOCK |
|---|---|
| 35 dB | 200 MHz |
| 40 dB | 250 MHz |
| 45 dB | 300 MHz |
| 50 dB | 350 MHz |
| 55 dB | 400 MHz |
| ⋮ | ⋮ |

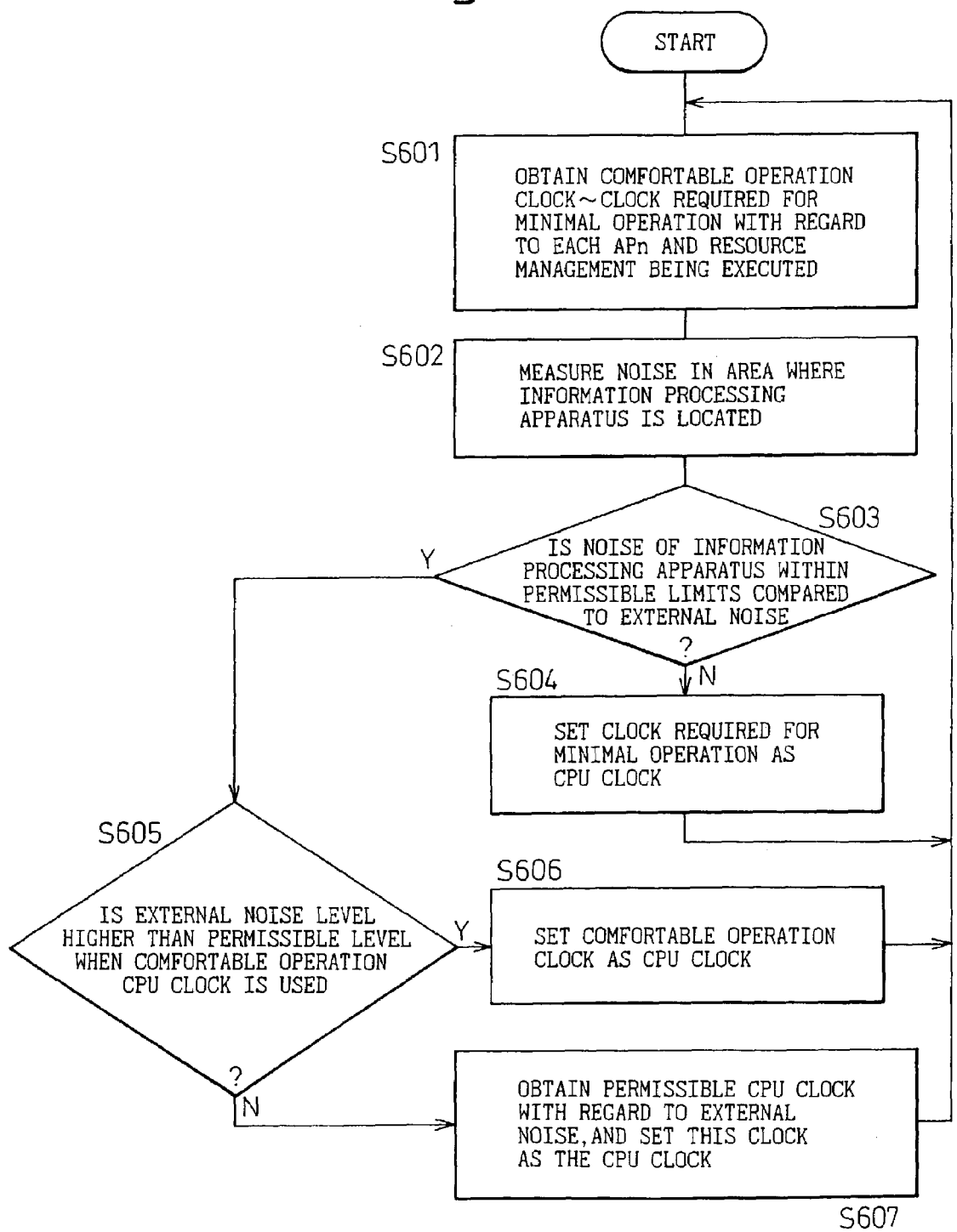

METHOD AND APPARATUS FOR DETERMINING A SYSTEM CLOCK FREQUENCY BY SUMMING CALCULATED CPU USAGE RATES FOR EACH OF A PLURALITY APPLICATIONS

CROSS-REFERENCE TO RELATED APPLICATIONS

This application is a continuation application and is based upon PCT/JP00/06169, filed on Sep. 8, 2000.

FIELD OF THE INVENTION

The present invention relates to a clock control method, apparatus and recording medium in an information processing apparatus, in particular to a clock control method, apparatus and information recording medium that can provide an operator with optimum performance by changing the system clock of the information processing apparatus according to the usage environment (power source state conditions, temperature conditions and noise conditions) and the applications being used.

DESCRIPTION OF THE RELATED ART

Recently, in information processing apparatuses such as personal computers and the like, performance has been advancing and along with this, high speed CPUs are being installed.

However, when installing high speed CPUs, because the operating clock frequency of the CPU is high, the power consumption of the CPU increases.

As a result, there are the problems of energy conservation with regard to the power consumption of the information processing apparatus, and extending the battery time in a notebook type personal computer or the like with a built-in battery.

In order to solve these problems, various methods of controlling the clock frequency of the information processing apparatus, to reduce the operating clock frequency of the CPU when an application is being run, have been developed.

In these prior art methods, for example in those disclosed in Unexamined Patent Publication (Kokai) No. 9-2376132, Unexamined Patent Publication (Kokai) No. 9-297688 and Unexamined Patent Publication (Kokai) No. 9-305268, clock control in the information processing apparatus is performed in response to an event which occurred in an I/O interface.

The loads of a plurality of applications running at the same time each differ, but in an information processing apparatus in which a high speed CPU is mounted, the resource management means assigns a needlessly high clock to even the lightest applications, for example, so that resources are needlessly wasted.

Methods to solve this are disclosed in Unexamined Patent Publication (Kokai) No. 10-143274, Unexamined Patent Publication (Kokai) No. 11-194849 and the like. In these prior art methods, the processing speed, processing time and CPU usage amount are registered corresponding to each application beforehand, in accordance with the processing operation of the CPU in the data processing apparatus, and the clock frequency of the CPU is variably controlled based on the processing capacity, processing time and usage amount of the applications with respect to the processing speed of the CPU. According to these methods, by monitoring the load state of the applications, better clock control of the CPU is possible.

However, in these prior art methods, when multitasking of applications is executed, there are cases where the required resources of an application exceed the actual resources of the information processing apparatus. In cases such as this, not only can optimum performance not be provided to the operator, but upgrading of the information processing apparatus is necessary.

Incidentally, there is no means for evaluating the performance of the information processing apparatus and automatically notifying the operator. Therefore, the optimum time to upgrade the information processing apparatus is completely determined based on the experience of the operator. However, it is difficult for the operator to determine the optimum time to upgrade the system.

Therefore, it is necessary to obtain the necessary time for upgrading the information processing apparatus and automatically signal an alarm to the operator.

Also, according to the prior art methods described above, the system clock is changed only by selecting the processing speed and time of an actual execution time to obtain the CPU processing speed, based on the processing speed, processing time and CPU usage rate, registered beforehand, for each running application. Accordingly, the processing speed of the CPU is not a needlessly high speed, due to the system clock being changed, and power consumption is reduced. However using information processing apparatuses in environments that are severe, with regard to power source state conditions, and further, temperature conditions and noise conditions, has not been considered.

In the prior art methods, because the CPU operates with a clock frequency that is higher than that necessary for the application, power is consumed needlessly and, for example, not only is there the problem of the battery life of notebook computers being shortened but, also, where the remaining power of the battery is low, an optimum performance cannot be expected and there is the problem of consuming the remaining amount of power effectively and prolonging the life of the battery.

Further, in these prior art methods, with respect to heat generation in the information processing apparatus, means for force cooling using fans or the like are provided. The cooling system of the information processing apparatus is typically one that provides cooling power capable of responding to the maximum amount of heat that is generated, estimated at the design stage.

Hence, in the information processing apparatus, even when performance that requires forced cooling is not required, forced cooling corresponding to maximum heat radiation is performed while applications are actually running, and operation noise is generated even when the amount of heat generated is low. This is not a problem where the external noise in the environment in which the information processing apparatus is used is high, but has been a problem when external noise is low, where noise generated due to the information processing apparatus is noticeable.

The present invention has as its object to solve the above problems.

DISCLOSURE OF THE INVENTION

The following means have been proposed in order to achieve these objects of the present invention.

As a clock control method for executing a plurality of applications in an information processing system wherein, when a plurality of applications are running, a clock frequency necessary for running of the applications is assigned according to each the application, and the clock frequency in each of the plurality of applications is registered, a CPU usage rate is calculated for each application in the information processing system with respect to a maximum clock frequency obtainable by the information processing system for running each of the plurality of applications and based on each registered clock frequency, a determined system clock frequency is set in the information processing system based on a total sum of calculated CPU usage rates for each application, and the applications are executed.

Here, if the number of times that the system clock frequency exceeds the maximum clock frequency increases, an information processing system upgrade necessity alarm is sent.

Also, as a clock control method, the clock frequency necessary for the running of the applications includes a first clock frequency at which the applications operate comfortably and a second clock frequency that is a minimum necessary for the applications to run, and when the information processing system is operating in a normal state, a first system clock frequency is determined based on the first clock frequency, while when the information processing system is operating in a specified state, a second system clock frequency is determined based on the second clock frequency, any one of the determined first and second system clock frequencies being set in the information processing system according to each state.

Where the specified state is a case where a power capacity in the information processing system changes, the second system clock frequency is set in the information processing system in place of the first system clock frequency according to a change in a detected remaining power source energy, while in a case where an operation reservation time for the information processing system has been set, any one selected from among the first system clock frequency and the second system clock frequency is set in the information processing system such that an operation time calculated from the detected remaining power source energy is at least equal to the operation reservation time.

Further, where the specified state is a case where a temperature in the information processing system changes, the system clock frequency is variable, and said system clock frequency is set in the information processing system, according to a change in a detected temperature, the second system clock frequency is set in the information processing system when the temperature is within a range in which erroneous operation of the information processing system occurs, the system clock frequency is increased by a predetermined width from the second system clock frequency and set as the system clock frequency in the information processing system when the temperature is close to the range in which erroneous operation of the information processing system occurs, and the second system clock frequency is decreased by a predetermined width from the first system clock frequency and set as the system clock frequency in the information processing system when the temperature is far from a range in which erroneous operation of the information processing system occurs.

A clock method that, when the specified state is a case where external noise of the information processing system changes, the system clock frequency is variable, and said system clock frequency is set in the information processing system, according to a change in a detected external noise.

When the noise of the information processing system is within a permissible range with respect to an amount of external noise, the second system clock frequency is set in the data processing system. When a measured external noise level, based on a permissible clock frequency corresponding to a noise level generated from the information processing system and prepared beforehand, is higher than a noise level corresponding to the permissible noise clock frequency, the first system clock frequency is set in the information processing system. When a measured external noise level is lower than a noise level corresponding to the permissible noise clock frequency, the permissible clock frequency corresponding to the external noise level is set in the information processing system.

In order to realize the above clock control method in an information processing system, a recording medium for holding programs to be executed in an information processing system is proposed.

Also, in an information processing apparatus that can run a plurality of applications, a memory unit for registering clock frequencies necessary for execution, obtained from each application, in each of a plurality of applications, and a control unit for calculating a CPU usage rate of each of the applications for the information processing apparatus with respect to a maximum clock frequency obtainable by the information processing apparatus for running each of the applications, based on each of the clock frequency registered in the memory section, determining a system clock frequency for the information processing apparatus based on a total sum of calculated CPU usage rates for each application, and setting the system clock frequency, are included.

Further, the control unit sends an information processing system upgrade necessity alarm when the number of times that the system clock frequency exceeds the maximum clock frequency increases.

Moreover, the memory unit registers a first clock frequency at which applications can be operated comfortably and a second clock frequency necessary for minimum operation of the applications as the clock frequency necessary required for execution of the applications, and the control unit determines a first system clock frequency based on the first clock frequency when the information processing apparatus is operating in a normal state, determines a second system clock frequency based on the second clock frequency when the information processing apparatus is operating in a specific state, and sets any one of the determined first and second system clock frequencies according to each state.

Furthermore, the control unit detects a change in the remaining power source energy in the specific state and sets the second system clock frequency in place of the first system clock frequency according to a detected change, and also selects and sets any one of the first system clock frequency and the second system clock frequency, so that an operation time calculated from a detected power capacity is equal to or higher than a previously set operation reservation time.

Further still, the control unit measures a temperature inside the information processing apparatus as the specified state, varies the system clock frequency corresponding to the measured temperature and sets the system clock frequency, and, when the temperature is within a range in which erroneous operation of the information processing system occurs, sets the second system clock frequency, when the temperature is close to the range in which erroneous operation of the information processing system occurs, increases the system clock frequency by a predetermined width from the second system clock frequency and sets it as the system clock frequency, and when the temperature is far from a range in which erroneous operation of the information processing system occurs, decreases the second system clock frequency by a predetermined width from the first system clock frequency and sets it as the system clock frequency.

Yet further still, the control unit measures external noise as the specified state, varies the system clock frequency according to a change in the external temperature and sets the system clock frequency, and, when the noise of the information processing system is within a permissible range with respect to the amount of external noise, sets the second system clock frequency, when a level of measured external noise is higher than a noise level corresponding the permissible clock frequency, a permissible clock frequency corresponding to a noise level generated from the information processing apparatus is registered in the memory unit and the control unit sets the first system clock frequency, and when a level of measured external noise is lower than a noise level corresponding the permissible clock frequency, a permissible clock frequency corresponding to a noise level generated from the information processing apparatus is registered in the memory unit and the control unit sets the permissible clock frequency corresponding to an external noise level.

In this manner, according to the present invention, a clock frequency under which applications can be operated comfortably and a clock frequency that is the minimum under which applications can operate are registered as clock frequencies necessary for execution of each of the applications, and a CPU usage rate corresponding thereto can be obtained. As a result, it is possible to change the system clock of the information processing apparatus according to usage conditions such as power source conditions, temperature conditions and noise conditions, and the applications being used, so that optimum performance can be provided for the operator.

BRIEF DESCRIPTION OF THE DRAWINGS

The present invention will be explained below with reference to the enclosed drawings.

FIG. 2 is a first management table provided within the resource management unit.

FIG. 6 is a second management table provided within the resource management unit.

FIG. 13 is a third management table provided within the resource management unit.

FIG. 14 is a flowchart explaining the operation of the resource management unit shown in FIG. 12.

DETAILED DESCRIPTION OF THE PREFERRED EMBODIMENTS

Before explaining the embodiments of the present invention, a basic form of the present invention will be described with reference to FIGS. 1 through 4.

Figure 1:
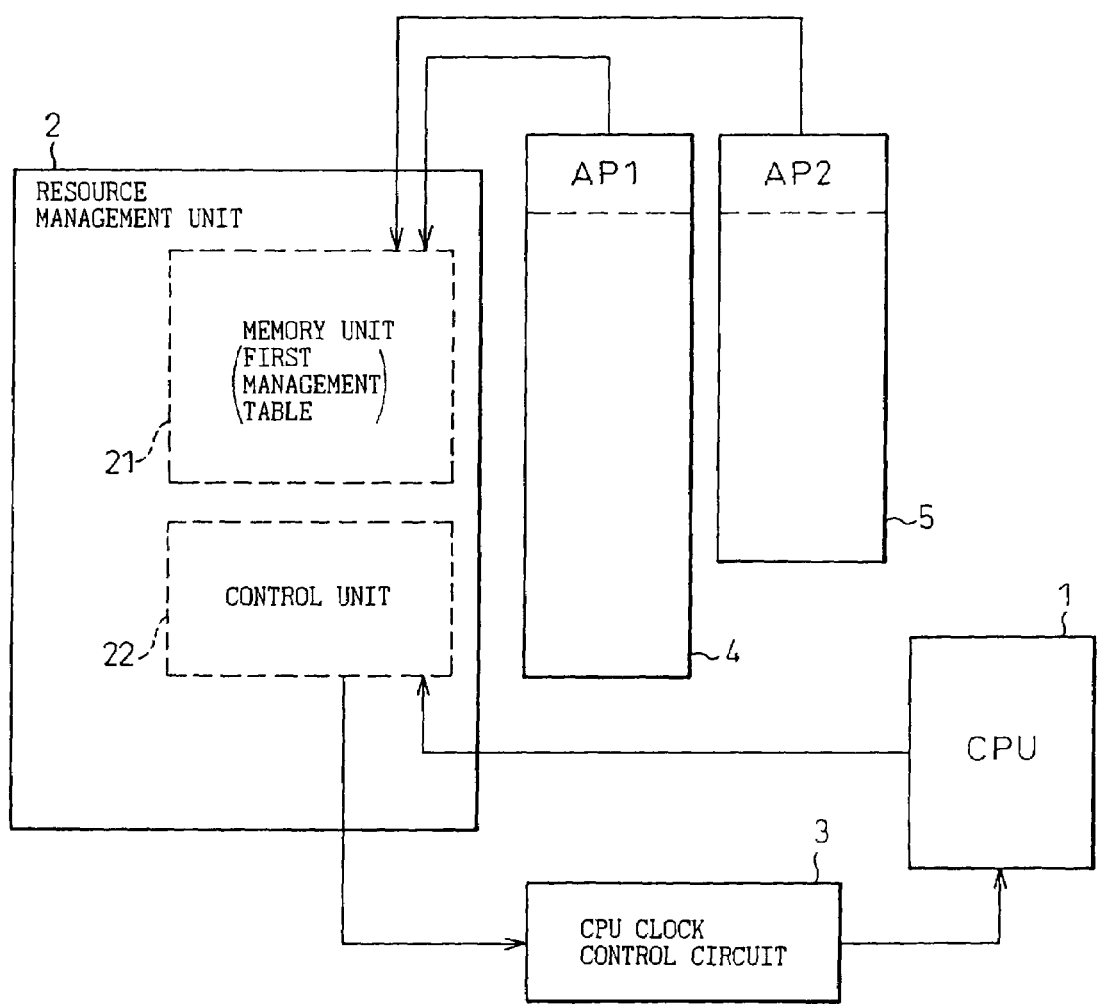
FIG. 1 is a rough block drawing of the resource management means in an information processing apparatus.

FIG. 1 is a block drawing of parts relating to resources management in a resource management unit of an information processing apparatus such as a personal computer (PC), for example.

The PC shown in FIG. 1 is provided with a CPU1, for example, constructed to run various applications via an OS such as Windows. Also, in order to drive this PC, resource management unit 2 is prepared to manage the resources of the OS and various applications.

In FIG. 1, although AP1 and AP2 are shown as representative of applications 4 and 5, it is normal for a plurality of applications APn to be stored in the PC. In particular, multitasking of the application AP1 and AP2 is executed as shown in FIG. 1.

The resource management unit 2 has a memory unit 21 and control unit 22, the memory unit 21 housing information required for resource management and the control unit 22 drive controlling the PC based on the resource management information. Further, the control unit 22 has a function for supervising and measuring the CPU usage rate of the CPU 1 under a system clock.

In the PC, a CPU clock control circuit is provided for generating a system clock and supplying the system clock to the CPU 1, and the generated clock frequency is variably controlled by the control unit 22.

In the memory unit 21, the clock frequency for comfortable operation of each application is obtained and stored as one type of resource management information. The clock frequency for comfortable operation is a clock frequency specific to a relevant application at which an operator feels comfortable operating the PC while the relevant application is running.

The application vendor considers to what extent the application can be comfortably operated and writes this into the application beforehand. Then, when the PC is running, it obtains the comfortable operation clock frequency written into each of the applications from the application concerned with multitasking, and creates the first management table shown in FIG. 2 to store them in the memory unit 21.

In recent PCs, generally, speed increases are progressing, and clocks of higher speeds than the comfortable clock frequencies of running applications are being used. As a result, the CPU, even if operating at these high clock frequencies, does not itself actually operate, but is in a standby state such as waiting for keyboard operation by the operator or waiting for storage access for a CD-ROM or the like, so that the overall usage of the CPU decreases. Setting a comfortable operating clock frequency for each application counters the decrease in CPU usage rate.

In FIG. 2, as shown in FIG. 1, the applications AP1 and AP2 are running and, therefore, 30 MHz is obtained from the application AP1 and 60 MHz from the application AP2, and these are stored in the table. Also, 30 MHz is stored in the "resource management" application list as the comfortable operation of the OS.

Although the application vendor writes the comfortable operating clock frequency into the application beforehand, the operator can also store a comfortable operating clock frequency in the first table for each application.

Next, the control unit 22 calculates the CPU usage rate for each application when the CPU is driven by a comfortable operating clock, based on the clock frequencies stored in the first management table, and records it in the table. For this calculation, the maximum clock frequency obtainable by the PC currently in use is used. This is normally the clock frequency that indicates performance with respect to the operating speed of the PC.

In the example shown in FIG. 2, a case wherein the maximum clock frequency attainable by the PC is 300 MHz is shown. The comfortable operating clock frequency of the application AP1 is 30 MHz, therefore the CPU usage rate while application AP1 is running is 10%, while the comfortable operating clock frequency of the application AP2 is 60 MHz, the CPU usage rate therefore being 20%. Similarly, the CPU usage rate for resource management is 10%.

Since multitasking of the applications is executed, the PC's CPU usage is the total sum of the CPU usage rate for each application running. According to the example of FIG. 2, the total sum of CPU usage rate is 40%.

Consequently, even if the system clock frequency of the PC is 300 MHz, within that clock frequency it is sufficient for the CPU to operate at 40% of the clock frequency for the operator to feel he or she is operating the PC comfortably. Since 300 MHz×40%=120 MHz, the system clock frequency of the PC can be changed from 300 MHz to 120 MHz.

The control unit 22 obtains the system clock frequency of the PC from the total sum of the CPU usage rate, and sends an instruction to the CPU clock control circuit 3 to change the system clock frequency from 300 MHz to 120 MHz. Then, the CPU clock control circuit 3 supplies the changed 120 MHz clock to the CPU 1.

As described above, by determining the comfortable operation clock frequency of each application according to the load on the PC, i.e. according to the applications in operation, the clock frequency can be obtained from the total sum of CPU usage rate. Also, that clock frequency can be set as the system clock frequency.

Next, the operation of the resource management unit 2 shown in FIG. 1 will be explained with reference to the flow chart of FIG. 3.

When multitasking of the applications is started, the resource management unit 2 obtains comfortable clock frequencies from the applications APn being run, creates the first management table shown in FIG. 2, and stores them. Then, based on the clock frequencies of each of the applications APn stored in the table, the CPU usage rate of each of the applications APn is obtained (step S101). These CPU usage rates are calculated based on the maximum clock frequency obtainable by the PC at the time.

The resource management unit 2, after obtaining the CPU usage of each of the applications APn, obtains a total sum of the CPU usage rates of each of the applications APn, then obtains and sets a system clock frequency that the PC can be comfortably operated at by means of the maximum clock frequency. The CPU clock control circuit 3 changes and controls the obtained system clock frequency and supplies the system clock to the CPU 1 (step S102).

When the PC operates at the newly set system clock frequency, the resource management unit 2 measures the CPU usage rate of the currently operating CPU 1 (step S103).

At this time, whether the measured CPU usage rate is 100% or not is determined (step S104). This is because, if the CPU usage rate is 100%, there is the possibility that the operation of the CPU 1 may slow down when a plurality of applications APn are running at the set system clock frequency.

In step S104, if the measured CPU usage rate is 100% (Y), the process returns to step S101, the CPU usage rate of each of the plurality of applications APn is obtained, the process proceeds to step S102, and the system clock frequency is reset.

On the other hand, if in step S104 the measured CPU usage rate is not 100% (N), it is determined whether the CPU is operating in a state where the measured CPU usage rate is close to 100% (step S105). A state close to 100% means a state under 100% but, for example 95 to 100%, where there is some surplus in the CPU operation and it is operating at maximum efficiency.

In a state where the measured CPU usage rate is close to 100% (Y), the CPU can continue to be operated at the set clock frequency, therefore the process returns to step S103, the CPU usage rate is measured, and supervision is continued.

Also, in step S105, in a state where the measured CPU usage rate is far from 100% (N), the system clock frequency must be reset, so the process returns to step S101.

In this manner, the system clock frequency is obtained from the comfortable operation clock frequency of each application, according to a plurality of running applications, and this is set as the system clock of the PC and, therefore, the operator can use the applications comfortably.

Up till now, where a plurality of applications are running by means of the resource management unit 2 shown in FIG. 1, the operator can comfortably use the applications. However, when a large number of applications are running, if the maximum clock frequency obtainable by the PC is originally low, even if the comfortable operation clock frequency of each individual application is lower than the maximum clock frequency, there is the possibility that the PC is in an overload state. In other words, when a large number of applications are running, the performance may be insufficient.

In this kind of state, as it cannot be said that the operator can use the applications comfortably, if an alarm can be given to the effect that the PC cannot be operated comfortably due to insufficient performance, the operator can be simply and easily made aware of the necessity of a PC upgrade.

The resource management unit 2 used here, although it can have the block structure shown in FIG. 1, has a function that can determine insufficient performance of the CPU 1, added to the control unit 22 and connected to alarm means that operates according to the determination result. The alarm means can use a flashing lamp or the like, or a message display on the PC screen or the like.

The operation of the resource management unit 2 in this case will be explained with reference to the flowchart of FIG. 4.

Figure 3:
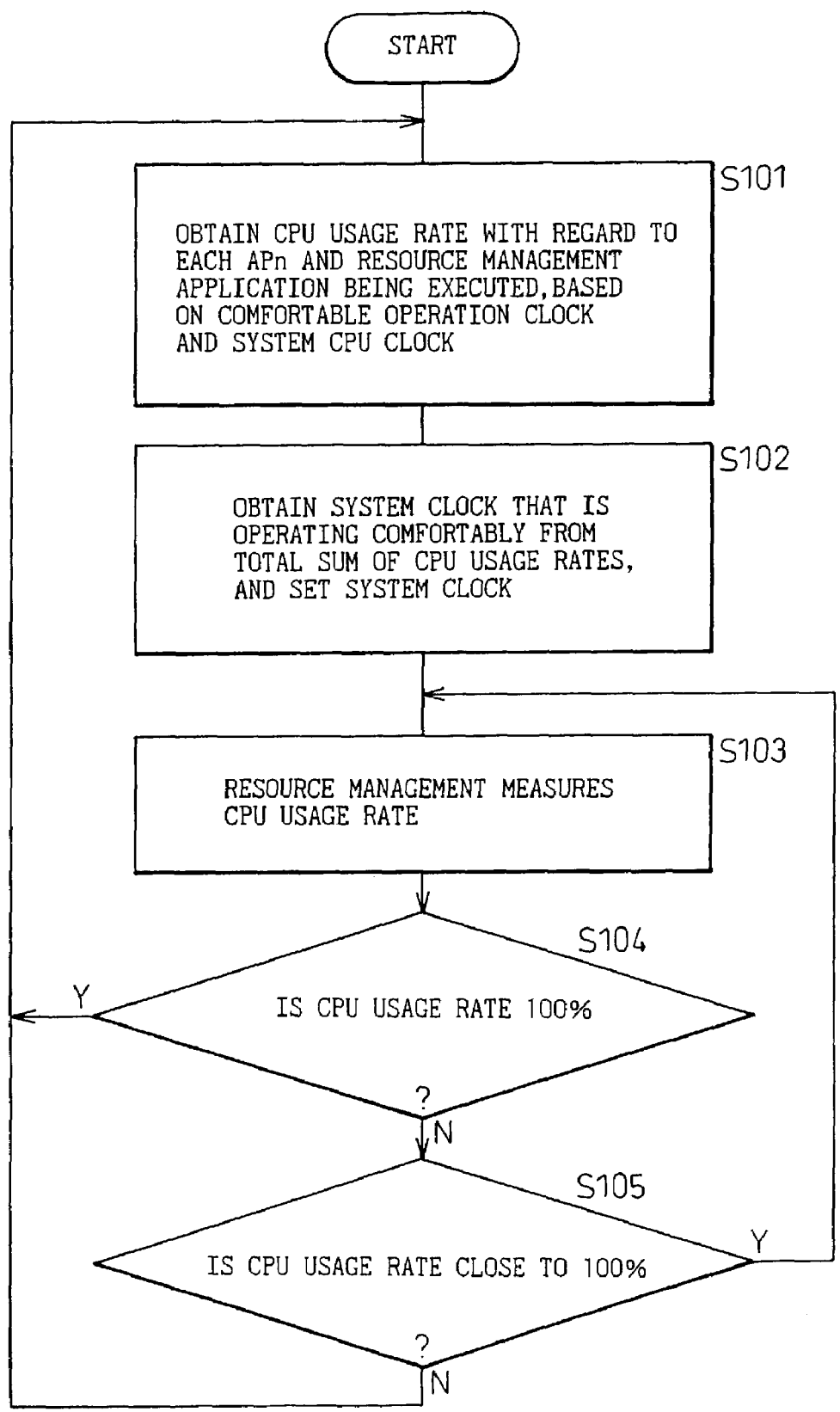
FIG. 3 is a flowchart explaining the operation of the resource management unit shown in FIG. 1.
Figure 4:
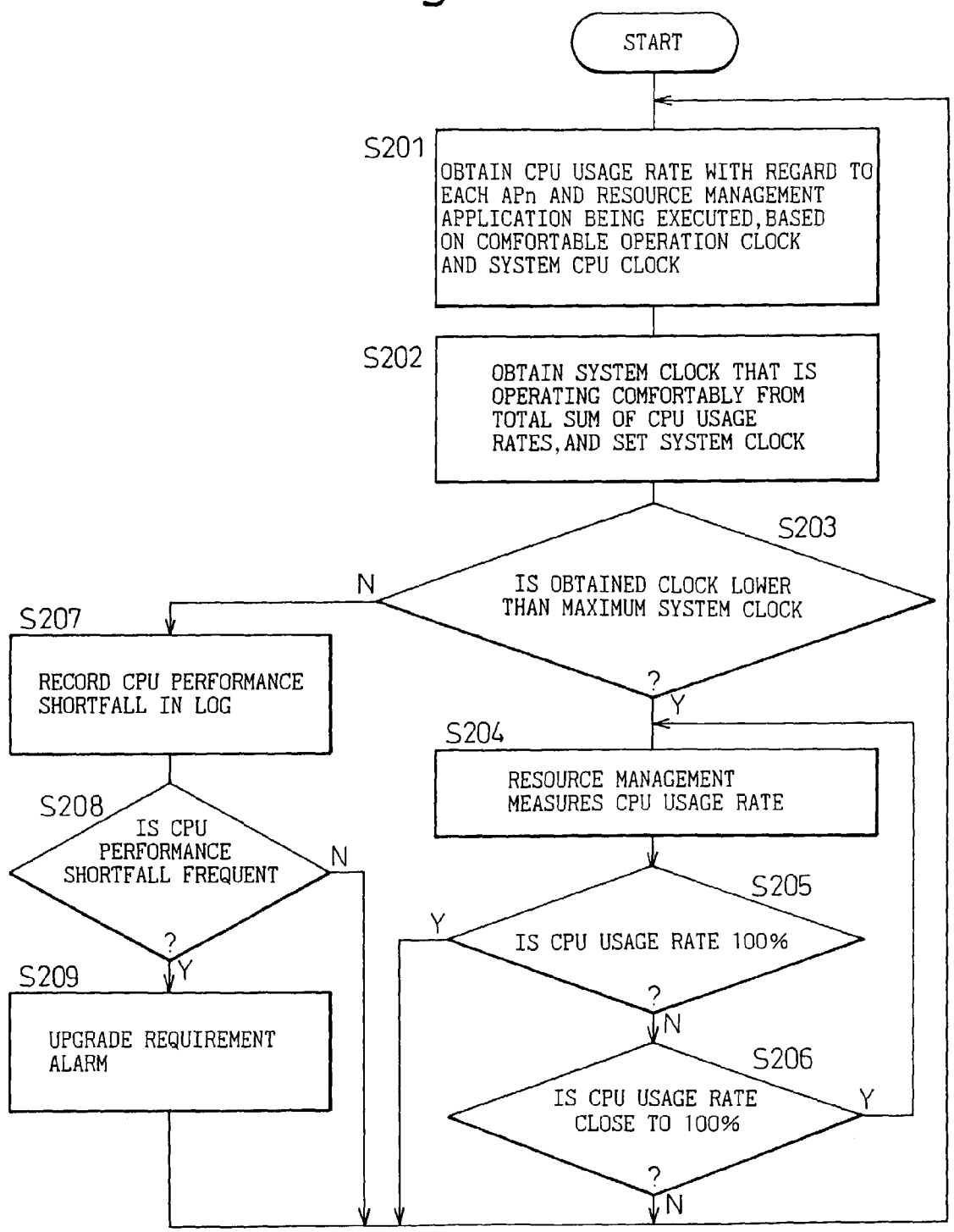
FIG. 4 is a flowchart explaining the operation of the resource management unit where an upgrade necessity alarm relating to the information processing apparatus is provided.

The operation shown in the flowchart of FIG. 4 is basically the same as the operation from step S101 to step S105 shown in the flowchart of FIG. 3, but differs with the insertion of step S203. An explanation of the same operation portions as those shown in FIG. 3 will be omitted here.

In step S203, it is determined whether the system clock frequency set in step S202 is lower than the maximum clock frequency obtainable by the PC. If the set system clock frequency is lower than the maximum clock frequency (Y), it cannot be said that the CPU 1 exhibits insufficient performance, so the process continues to step S204, and the operation is thereafter the same as that of steps S103 to S105 of FIG. 3.

On the other hand, in step S203, if the set system clock frequency is determined to be higher that the maximum clock frequency (N), there is a possibility that the CPU exhibits insufficient performance and, therefore, the CPU performance shortfall is recorded in a log (step S207).

However, the determination result of the performance shortfall of the CPU 1 may have only occurred a few times, for example, and temporarily fallen not too far into performance shortfall, and therefore not require an upgrade. As a result, where the determination result of performance shortfall of the CPU 1 is frequent, it is determined that an upgrade is necessary (step S208).

In step S208, if the determination result of performance shortfall stops after several times (N), there is no requirement for an upgrade and, therefore, the process returns to step S201 and proceeds with the operation to reset the system clock frequency. Also, where performance shortfall is frequent (Y), an alarm is activated to the effect that an upgrade is required due to the performance shortfall of the CPU 1 (step S209).

By adding this kind of operation to the resource management unit 2, an alarm can be given when comfortable operation can be attained due to a performance shortfall in the PC, and the operator can be simply and easily be made aware of the necessity of an upgrade to the PC.

According to the resource management unit 2 described above, the system clock of the PC is set lower than the maximum clock frequency and the CPU usage rate of the entire PC is increased so that the operator can use applications comfortably.

Also, in addition to obtaining the comfortable operation clock frequency of each application according to the applications that are being run, and adding system clock frequency control, the system clock frequency can be changed and controlled based on a power condition when the remaining capacity of the battery is low, a temperature condition corresponding to the heat generation amount of the CPU, and an environmental condition for suppressing noise generated by the PC corresponding to the environment in which it is being used (usage environment), so that the operator can use applications comfortably.

Here, the usage environment of the operator is divided into cases arising from power source state condition, temperature condition and environmental condition, and will be explained below with reference to FIGS. 5 through 14.

Cases Arising from Power Source State Conditions

Figure 5:
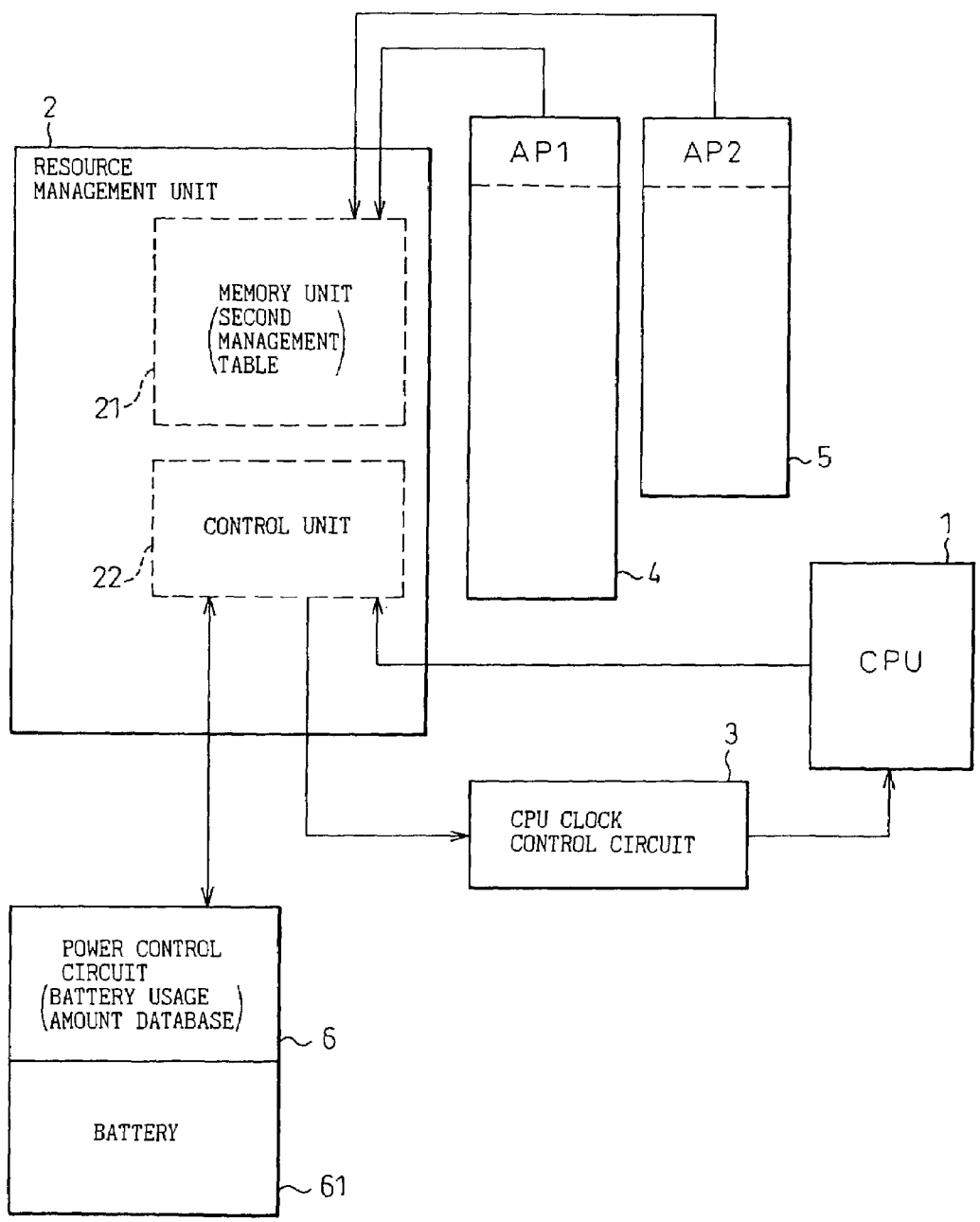
FIG. 5 is a rough block drawing of resource management unit that changes the system clock of the information processing apparatus according to a power source condition.

The resource management unit 2 shown in FIG. 5 differs from the resource management unit 2 shown in FIG. 1 in that the control unit 22 can obtain information relating to the remaining power of the battery from the power control circuit 6. A battery 61 is connected to the power control circuit 6 and the power control circuit 6 maintains a database relating to the remaining capacity of the battery. Further, in the resource management table stored in the memory unit 21 are recorded minimum operation clocks, in addition to the comfortable operation clocks, for each of the plurality of applications APn.

The second management table that can store minimum operation clocks as well as comfortable operation clocks is shown in FIG. 6. The basic structure of the second management table is similar to the first management table of FIG. 1, but can also store minimum operations clocks for each of the applications.

Minimum operation clocks means the minimum necessary clock frequency for practical use, although the operator may not be able to use the applications comfortably. This is written into each application beforehand by the application vendor.

When an application is run, the resource management unit 2, as well as the written comfortable operation clock frequencies, also obtains the minimum operation clock frequencies, records them in the memory unit 21, and creates a second management table.

According to the example shown in FIG. 6, the minimum operation clock frequency is 10 MHz for the application AP1 and 20 MHz for the application AP2, and 10 MHz for the resource management application. The control unit 22 calculates the CPU usage rate during minimum operation based on the these minimum operation clock frequencies. Here, where the maximum clock frequency obtainable by the PC is 300 MHz, if the CPU usage rate during minimum operation is obtained for each application, that of the application AP1 is 3.3% and that of the application AP2 is 6.6%, while that for resource management application is 3.3%.

Overall CPU usage rate during minimum operation is the total sum of CPU usage rate for all of the applications, therefore in the example of FIG. 6, that total sum is 13.3%. Where the maximum clock frequency obtainable by the PC is 300 MHz, the system clock frequency during minimum operation is 40 MHz (100 MHz×13.3%≈40 MHz).

By setting the thus obtained clock frequency as the system clock frequency, compared with the case of a 300 MHz system clock, if the CPU changes to a minimum operation state, the power consumption of the CPU can be greatly reduced and the operating time of the PC can be extended when the remaining power of the battery is low.

Next, the operation of the resource management unit 2 of FIG. 5 will be explained with reference to the flowchart of FIG. 7.

When multitasking of the applications is started, the resource management unit 2 obtains comfortable clock frequencies and minimum clock frequencies from the applications APn being run, creates the second management table shown in FIG. 6, and stores them. Then, based on the clock frequencies of each of the applications APn stored in the table, the optimum operation CPU usage rate and minimum operation CPU usage rate of each of the applications APn is obtained (step S301). These CPU usage rates are calculated based on the maximum clock frequency obtainable by the PC at the time.

The resource management unit 2, after obtaining the CPU usage rate during optimum operation and the CPU usage rate during minimum operation of each of the applications APn, obtains a total sum of the CPU usage rates corresponding to each of the operation times.

Here, the control unit 22 reads the battery remaining capacity data from the power control circuit 6 to measure the remaining power of the battery (step S302).

The system clock frequency is set beforehand corresponding to the remaining battery power. The remaining battery power is set to a selective standard of a clock frequency during comfortable operation at 50 to 100%, an intermediate clock frequency during comfortable operation and minimum operation at 25 to 50%, and a clock frequency during minimum operation at 25% and less, and the system clock can be changed in steps according to the remaining battery power. It can also be set in smaller, more numerous stages. Of course, the CPU clock control circuit 3 is also designed to supply a system clock corresponding to these stepped changes, by an instruction from the control unit 22.

A system clock frequency to be supplied to the CPU is obtained with reference to the above selective standard, according to the remaining battery power measured in step S301 (step S302).

Whether the system clock frequency obtained here is above the clock frequency required for minimum operation is determined (step S304). This is because, if this is the clock frequency during minimum operation, it indicates that the remaining battery power is considerably low, the possibility of the battery running out during application use is high.

If the clock frequency obtained in step S303 is higher than the clock frequency during minimum operation (Y), this obtained clock frequency is set as the system clock of the PC (step S305). The operations of the steps S306 to S308 after step S305 are the same as the operations from step 103 to step 105 in FIG. 3.

Figure 7:
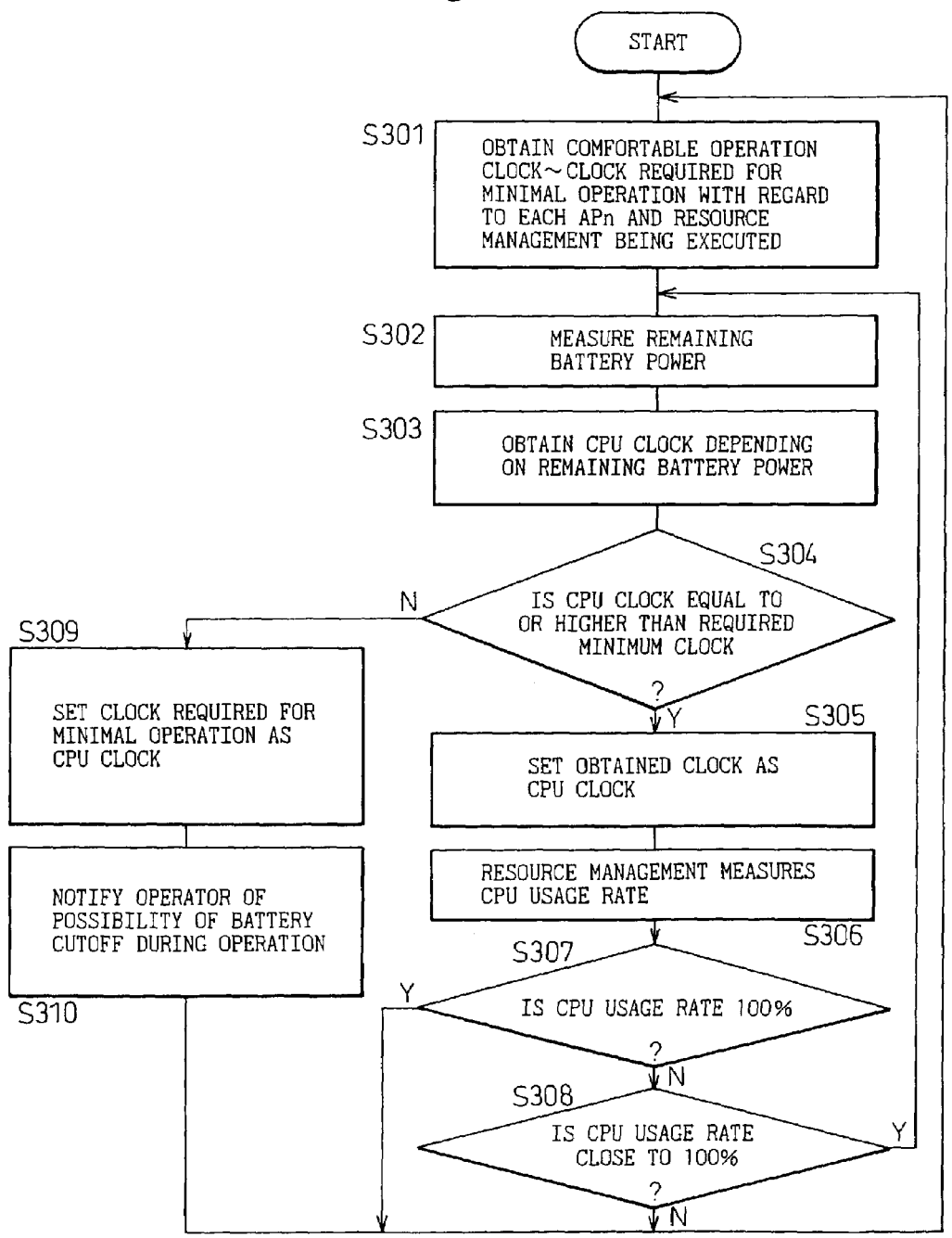
FIG. 7 is a flowchart explaining the operation of the resource management unit shown in FIG. 5.

However, in the operation shown in FIG. 7, because a clock frequency corresponding to the remaining battery capacity is obtained, if the measured CPU usage rate is close to 100% (Y in step S308), the process returns to step S302 to continue monitoring the remaining battery power.

On the other hand, if the clock frequency obtained in step S303 is the clock frequency for minimum operation (N in step S304), the obtained clock frequency, in other words the minimum operation clock frequency, is set as the system clock of the PC (step S309). If the minimum operation clock frequency is set as the system clock of the PC, this means that the remaining battery power is low. As the possibility of the battery running out while the operator is using an application is high, the operator is informed by an alarm that there is the possibility of the battery running out (step S310). When the operator notices this alarm, he or she can stop using the application, or start charging the battery.

Then, after the alarm notification, the process returns to step S301 and resets the system clock frequency.

As the PC system clock is changed according to the load on the PC and the remaining battery power, not only can the operator comfortably use the applications, but there is also the possibility of greatly extending the usage time of the PC. Also, the operator can be made aware of battery cut-off while using an application before it happens.

The embodiment just described with reference to FIGS. 5 through 7, by simply changing the clock according to the remaining battery power and application information (comfortable operation clock frequency~minimum necessary clock frequency), aims at achieving a balance between battery life and comfortable performance. However, in an actual environment in which a notebook computer is used, this cannot answer requirements where one wishes to operate at a extremely comfortable clock frequency for a fixed amount of time only, such as, for example, being able to operate the computer while in an airplane, or operate the computer during a meeting.

Here, an actual usage reservation time is input to the resource management unit 2 of FIG. 5 beforehand by the operator, and the resource management unit 2, by accessing a database of battery usage per unit of time for each CPU clock, based on the remaining battery power and the actual usage reservation time, can calculate a clock frequency with extremely comfortable performance during the operator's actual usage time.

Figure 8:
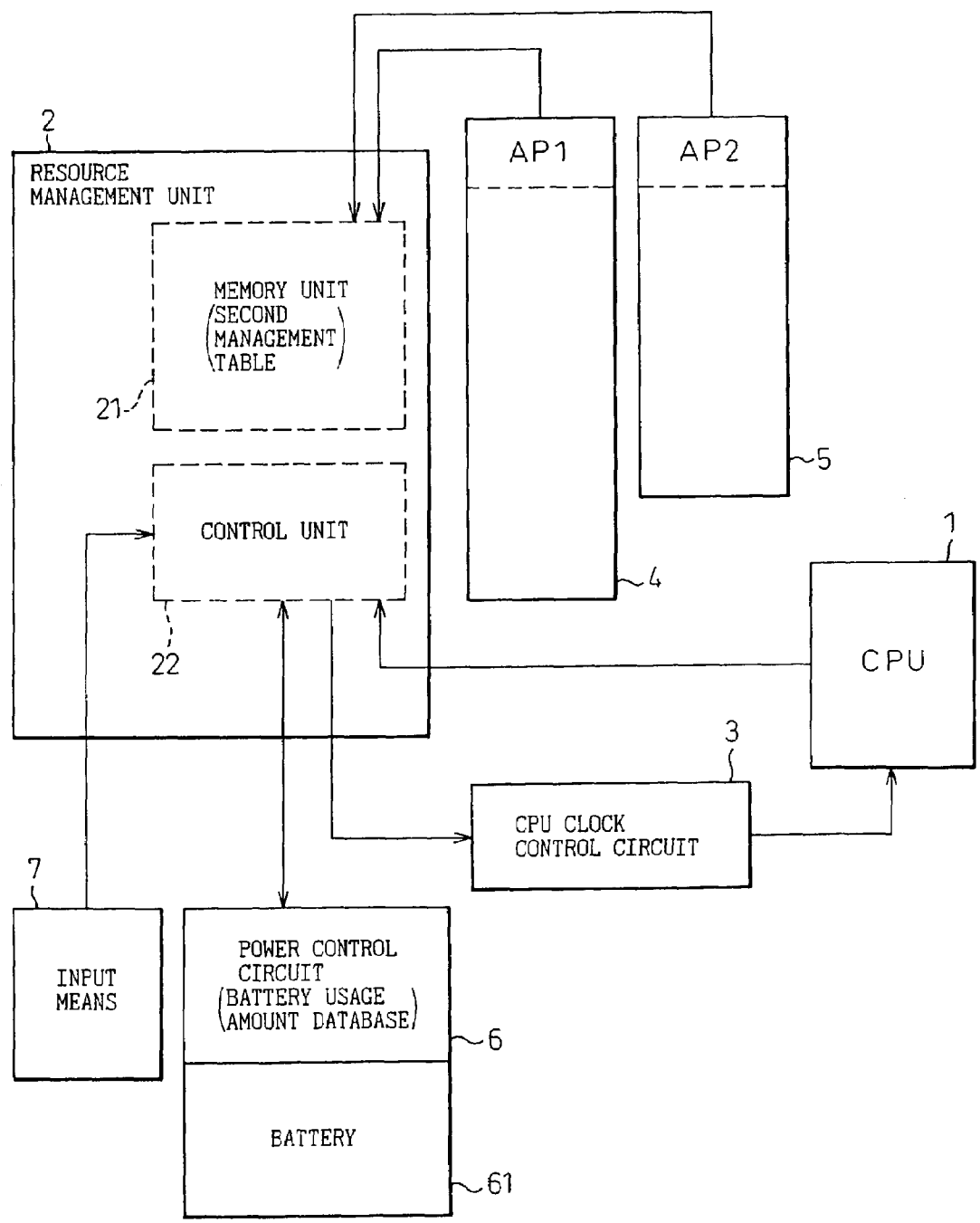
FIG. 8 is a rough block drawing of resource management unit that changes the system clock of the information processing apparatus according to remaining battery power.

Although FIG. 8 shows a resource management unit that can input an actual usage reservation time, it has the same structure as the resource management unit shown in FIG. 5, and the same portions have been assigned the same reference numbers.

The resource management unit 2 shown in FIG. 8 is the resource management unit 2 of FIG. 5, to the control unit 22 of which is connected an input means 7. This input means 7 is specifically a keyboard, mouse, or the like, belonging to a notebook type computer, but must have a function by which the operator can input beforehand an actual usage time to the resource management unit 2 before running an application.

Next, the operation of the resource management unit 2 of FIG. 8 will be explained with reference to the flowcharts of FIGS. 9A and 9B.

Figure 9A:
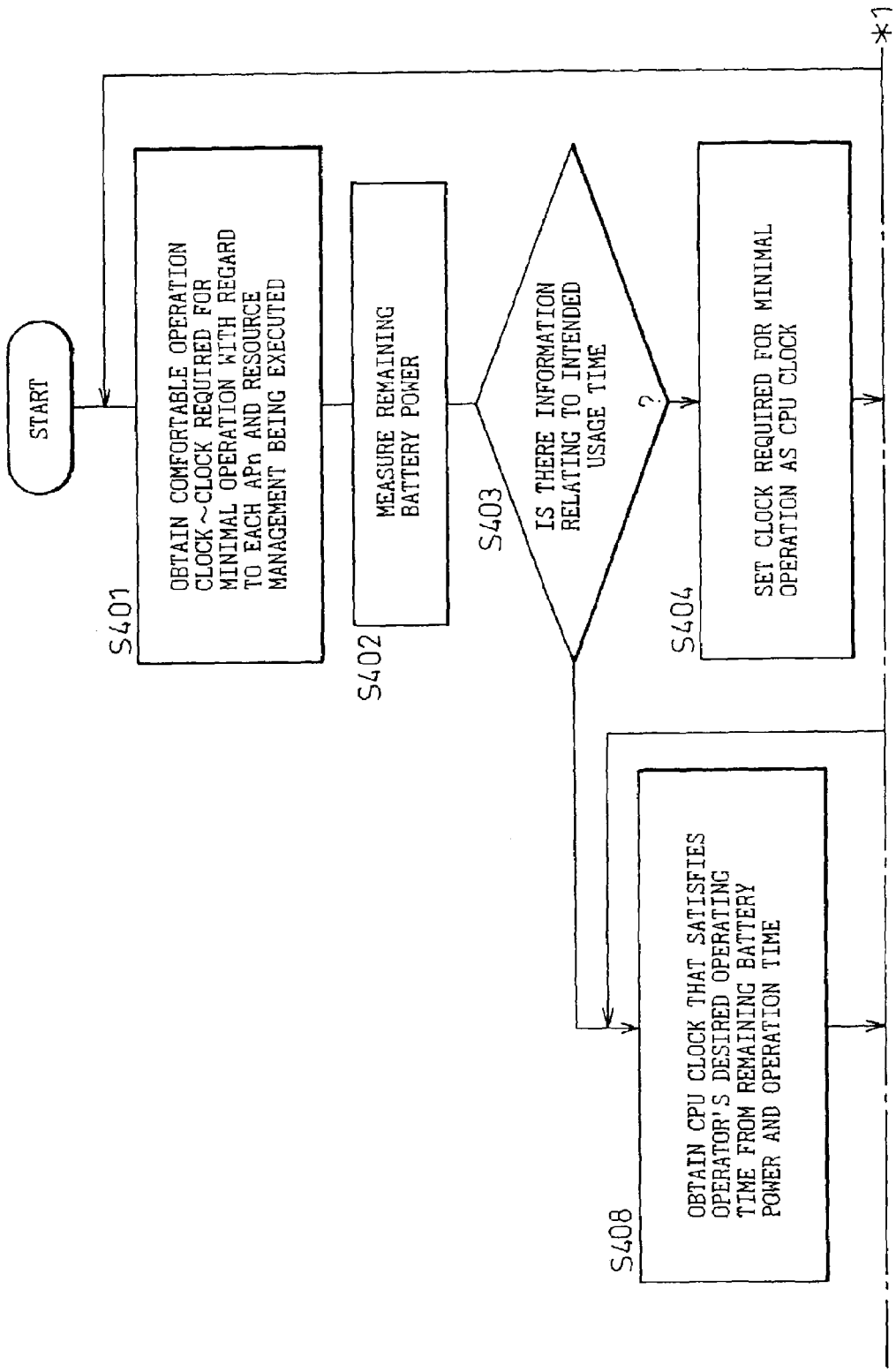
FIG. 9A and FIG. 9B are flowcharts explaining the operation of the resource management unit shown in FIG. 8.
Figure 9B:
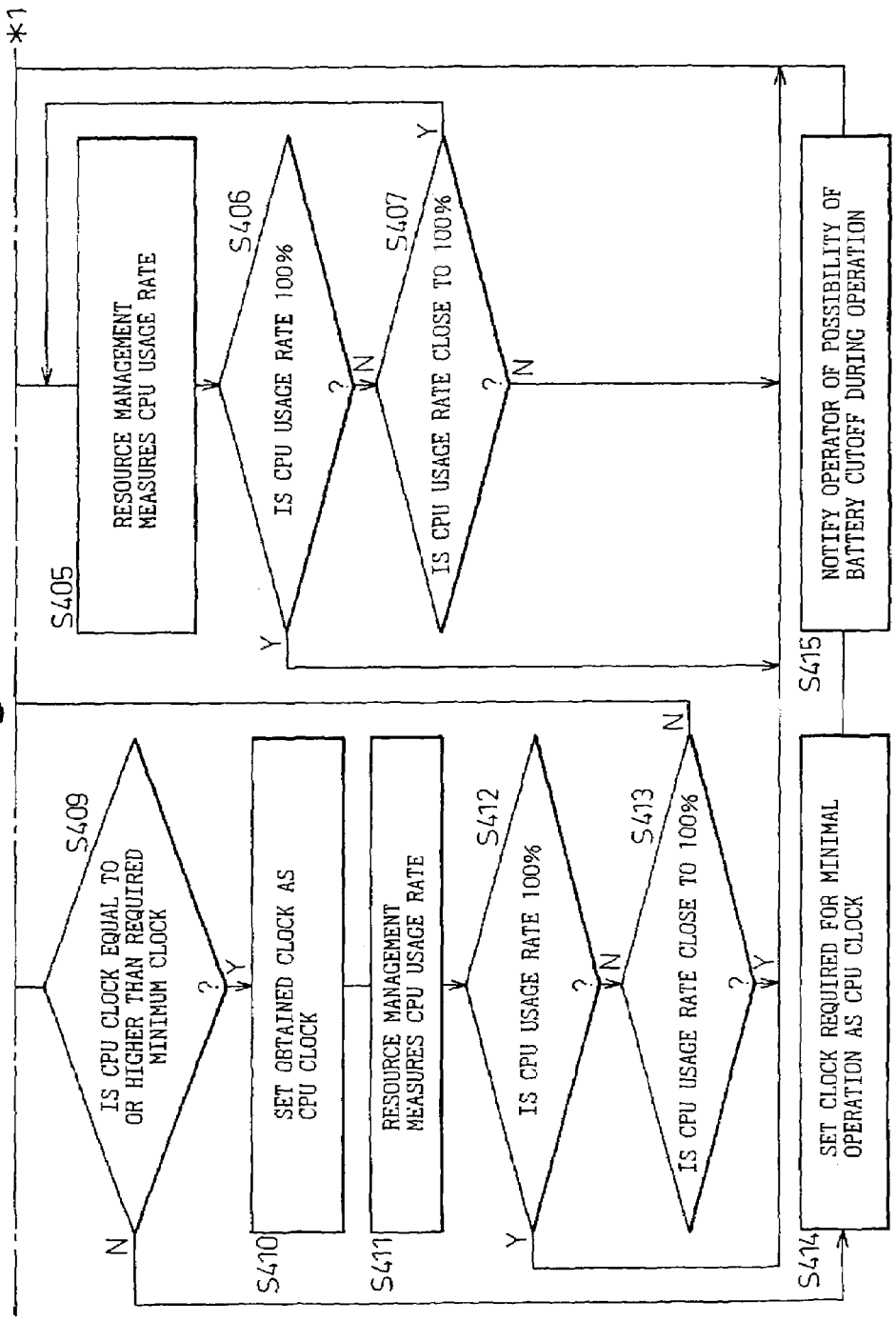

In steps S401 and S402 of FIG. 9A, the second table shown in FIG. 6 is created, in the same operation as steps S301 and S302 of FIG. 7, and thereafter the remaining battery capacity is measured.

Here, before using an application, the operator verifies whether a reservation time for using applications has been input (step S403).

At this time, if a relevant reservation time has not been input (N), although it is also possible to set the CPU clock frequency according to the remaining battery capacity as in the operation from step S303 onward in FIG. 7, in the flowchart of FIG. 9A, the clock frequency necessary for minimum operation is obtained from the second management table of FIG. 6 and set as the PC system clock (step S404).

After the PC system clock has been set, the operation of steps S405 through S407 is the same as the operation from step S103 to step S105 in FIG. 3 and, therefore, an explanation thereof will be omitted here.

On the other hand, in step S403, if input of an operation reservation time is verified by the operator (Y), the CPU clock frequency is obtained from the measured remaining battery capacity and the input reservation time (step S408).

For example, if the CPU clock frequency has been determined, the CPU power consumption per unit of time can be obtained. Therefore, using this CPU power consumption per unit of time, the operable time can be obtained from the measured remaining battery power, and the CPU clock frequency for that time specified.

A CPU clock frequency is then obtained such that the obtained operable time is longer than the input reservation time.

As the CPU clock frequency obtained here must be the clock frequency necessary for minimum operation, it is determined whether the obtained CPU clock frequency exceeds the clock frequency for minimum operation (step S409).

If the obtained CPU clock frequency exceeds the clock frequency for minimum operation (Y), the obtained CPU clock frequency is set as the system clock (step S410). Thereafter, the operation of steps S411 to S413 are the same as steps S405 to S407, but if where the measured CPU usage rate is far from 100% (N in step S413), the possibility that the clock frequency can still be increased with respect to the running applications is shown, therefore the process returns to step S408 and the clock frequency is reset.

On the other hand, in step S409, if the obtained CPU clock frequency is the minimum operation clock frequency (N), the process advances to the operation of steps S414 and S415, and the minimum operation clock frequency is set as the system clock and the operator is notified of the possibility of battery cut-off, the same as in the operation of steps S309 and S310 of FIG. 7.

In this way, because an operation reservation time can be input by the operator, optimal performance can be achieved for the reservation time according to the remaining battery power, battery cut-off can be dealt with, and it is possible to extend the effective battery usage time.

Cases Arising from Temperature Conditions

The above is a viewpoint of being able to use applications comfortably according to the remaining battery power, but the embodiment explained here is based on the viewpoint of being able to comfortably use applications according to the temperature of the PC.

Generally, when an application is run, the amount of heat generated from the CPU increases as the CPU clock frequency increases, and the amount of heat generated from the CPU decreases as the CPU clock frequency decreases. Consequently, in recent high performance PCs, because a high clock frequency is fixed as the system clock, the amount of heat generated is considerably high. It is necessary to suppress this heat generation.

In this embodiment, a temperature sensor is installed in the vicinity of the CPU, for example, so that the temperature of parts, which are easily affected by heat, heat generating parts, and the like within the PC can be measured, and according to the rise and fall of the temperature measured by this sensor, the system clock is changed to suppress the amount of heat generated by the CPU, while maintaining comfortable application execution.

Figure 10:
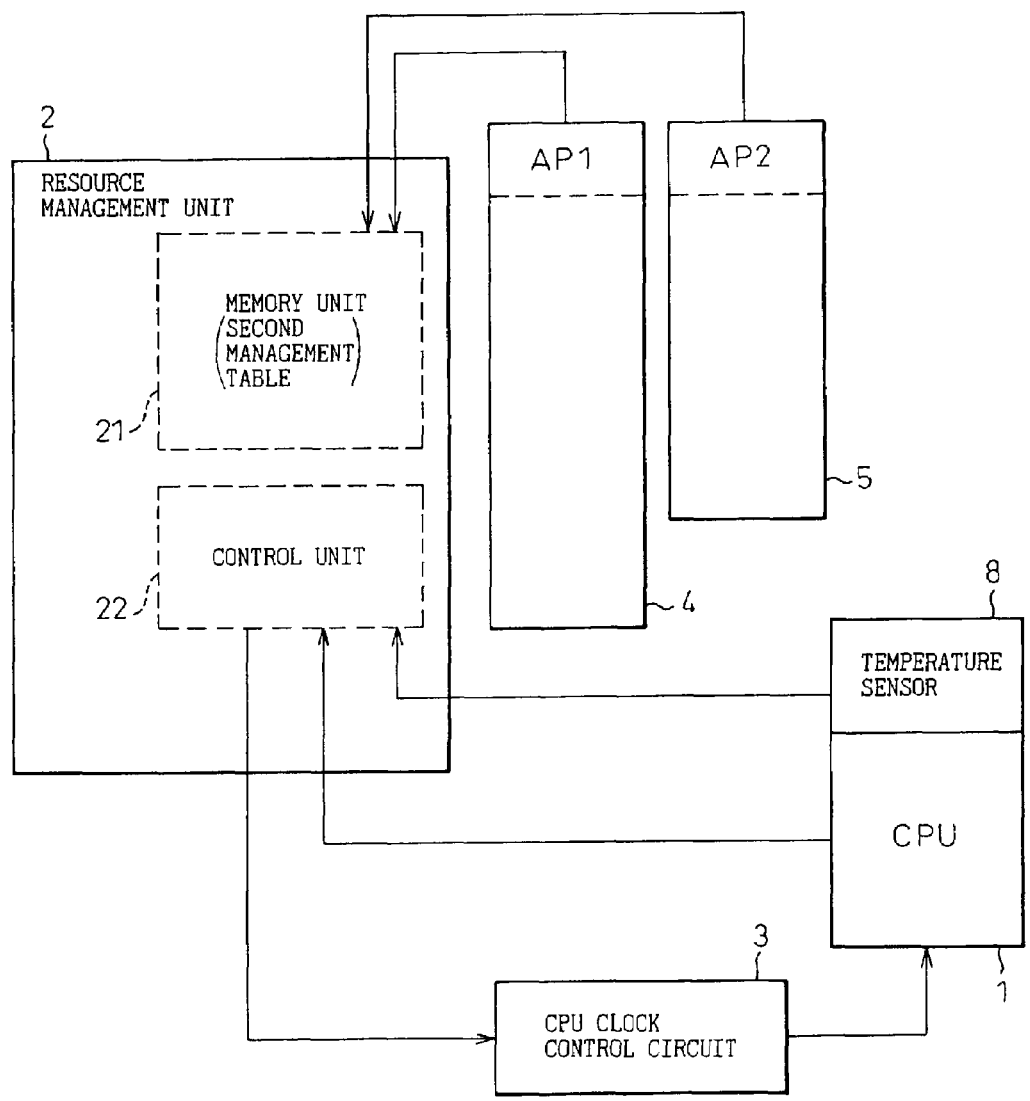
FIG. 10 is a rough block drawing of resource management unit that changes the system clock of the information processing apparatus according to a temperature condition.

The resource management unit used in this embodiment is shown in FIG. 10.

The structure of the resource management unit shown in FIG. 10 is the same as that of the resource management unit of FIG. 5, and the same reference numbers have been assigned to the same portions. However, a temperature sensor 8 in the vicinity of the CPU 1 has been added to the resource management unit 2 of FIG. 10, so that the temperature in the vicinity of the CPU 1 can be measured by the control unit 22.

The operation of the resource management unit 2 shown in FIG. 10 will be explained with reference to the flowchart of FIG. 11.

Firstly, when multitasking of the applications is started, in the same way as step S301 in FIG. 7, the resource management unit 2 obtains comfortable clock frequencies and minimum clock frequencies from the applications APn being run, creates the second management table shown in FIG. 6, and stores it. Then, based on the clock frequencies of each of the applications APn stored in the table, the optimum operation CPU usage rate and minimum operation CPU usage rate of each of the applications APn is obtained (step S301), based on maximum clock frequency obtainable by the PC at that time.

Next, the resource management unit 2 measures the temperature in the vicinity of the CPU 1 using the temperature sensor 8 and obtains temperature data for the heat generating parts (step S502).

It is then determined whether the measured temperature is within a range where the CPU 1 can operate within erroneous operations occurring (step S503). Normally, this range is set at 10° C. to 60° C. as a standard for electronic device parts, therefore this range is set as a range in which erroneous operation does not occur.

Here, if this measured temperature is outside this range, for example, if it exceeds 60° C. (N), the danger of erroneous operation of the CPU 1 is high, it is therefore necessary to decrease the clock frequency of the CPU to suppress the amount of heat generation by the CPU 1. As a result, the clock frequency necessary for minimum operation with applications running is set as the system clock (step S504) and the amount of heat generated by the CPU 1 is reduced.

Then, the process returns to step 501 and step 502, the resource management unit again measures the temperature in the vicinity of the CPU 1, and monitors whether that temperature is within the range where erroneous operation does not occur.

On the other hand, even if the measured temperature is within the range where erroneous operation does not occur (Y) in step S503, it is possible for it to be close to the limit of the range where erroneous operation does not occur, so there is no guarantee that erroneous operation will not occur. Here, it is determined whether the CPU is operating within a sufficient temperature margin (step S505). If the range in which erroneous operation does not occur is 10° C. to 60° C., a range with a sufficient temperature margin is set at 15° C. to 55° C.

Where the temperature measured in step S502 is within a range having a sufficient temperature margin (Y), if operation is executed at higher clock frequency than the currently set system clock frequency, since the amount of heat generated from CPU1 is still in low level, the system clock frequency is increased in predetermined fixed width in one step, for example, 10 MHz, and the increased clock frequency is set as the system clock frequency.

Thus, where the temperature measured in step S502 exceeds a range having a sufficient temperature margin (N), if operation is continued at the currently set system clock frequency, it is possible that the temperature will approach the limit of the range where erroneous operation does not occur. As a result, as it is safer to operate at a lower clock frequency, in which case the system clock frequency is decreased in predetermined fixed width in one step, for example, 10 MHz, the system clock is set in this way (step S507).

As described above, in the present embodiment, the temperature in the vicinity of the CPU is measured, and based on this temperature, the CPU clock frequency is set in consideration of a range within which erroneous operations do not occur and a range having a sufficient temperature margin, therefore not only comfortable operation according to the applications can be performed, but also the amount of heat generated from the CPU be suppressed, and the effect on parts easily affected by heat can be reduced and the operation of the PC optimized.

Cases Arising from Noise Conditions

In the embodiment described above, control of the CPU clock frequency aims to balance the operating environment with heat generated from the CPU and a comfortable CPU clock frequency, within a range where erroneous operation of the PC does not occur, by changing the system clock frequency according to temperature information from temperature sensors attached to parts easily affected by heat and application information (clock frequency for comfortable operation and minimum necessary clock frequency).

Incidentally, in a PC such as that located in an office for example, there are cases where there would normally be noises arising from a variety of sources in the office, and the noise generated by the PC itself is lost therein.

In such cases, even if a certain amount of noise is generated from the PC, providing the operator with performance that allows him or her to work comfortably is advisable. In other words, in order to provide comfortable performance, the CPU clock frequency should be somewhat high.

However, if the clock frequency is high, the amount of heat generated from the CPU at that time increases. As a result, it is necessary to set the system clock frequency so that the PC is within the range where erroneous operations do not occur due to heat, and the applications can be operated comfortably.

Conversely, if there is little noise within the office, it is preferable to suppress the noise generated by the PC as much as possible.

In this embodiment, a noise gathering apparatus represented by a microphone or the like is provided in the PC, and the resource management unit not only detects noise generated within the PC, but noise from external sources as well. The resource management unit, by means of a database relating to accessible CPU clock frequencies and detected noise, changes the CPU clock frequency based on application information (clock frequency for comfortable operation and minimum necessary clock frequency) within a permissible noise level range, and according thereto, also controls cooling fans.

Figure 12:
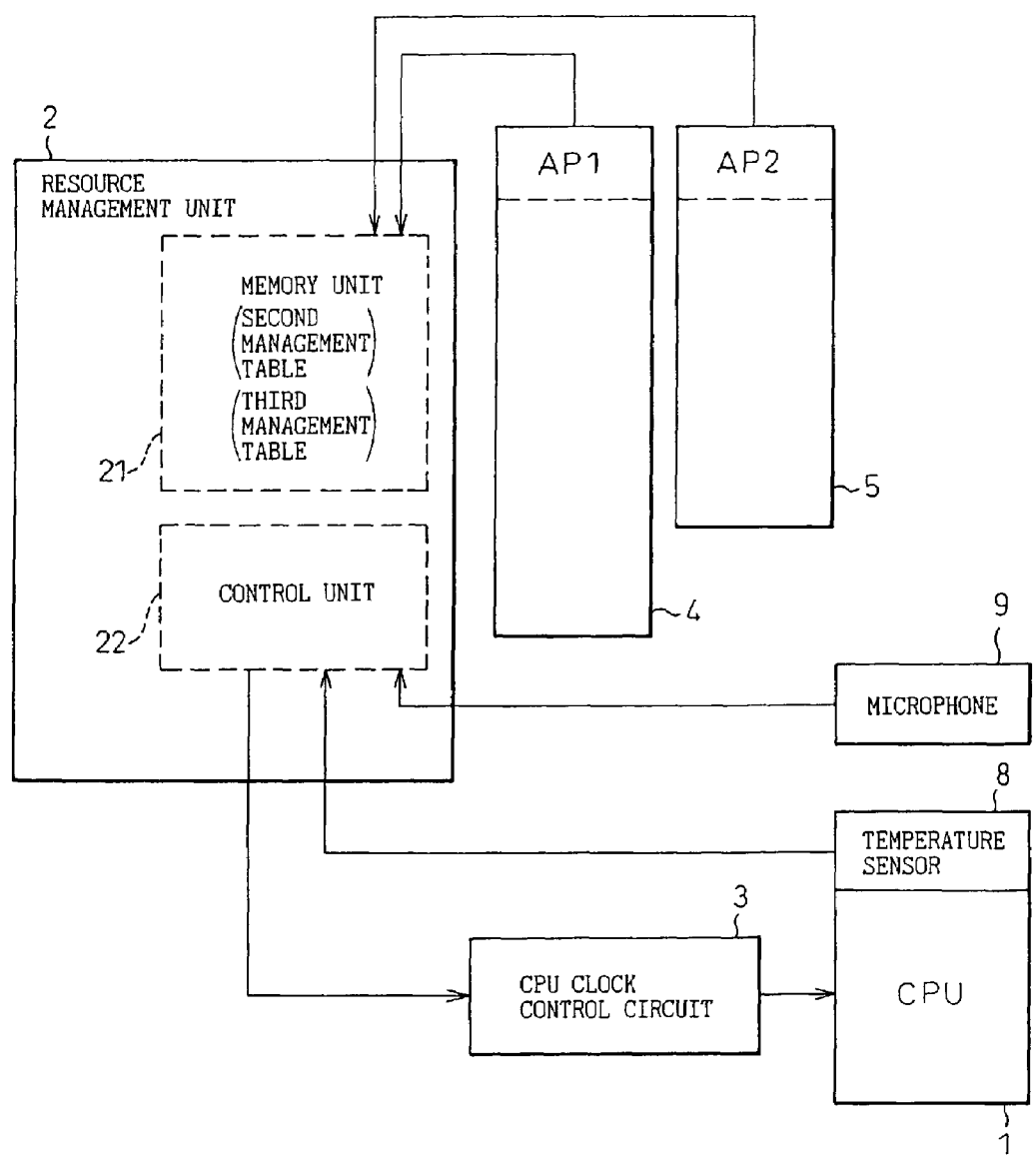
FIG. 12 is a rough block drawing of resource management unit that suppresses noise generated from the information processing apparatus to match a usage environment.

FIG. 12 shows the structure of the resource management unit according to the present embodiment.

The resource management unit shown in FIG. 12 is based on the resource management unit shown in FIG. 10, and the same parts are represented by the same reference numerals. In the resource management unit 2 of FIG. 12, a microphone 9 is installed in the vicinity of the PC and the control unit 22 obtains information relating to noise detected by the microphone 9.

As shown in the third management table of FIG. 13, as a PC system clock frequency suited to noise levels, a permissible CPU clock frequency is selected, for each noise level, and is stored in the memory unit 21. These permissible CPU clock frequencies are the maximum clock frequencies obtainable by the PC at each external noise level.

According to the noise level received by the microphone 9, the relevant permissible CPU clock frequency is obtained from the third management table. The PC clock frequency is changed according to the level of external noise, for example, if the external noise level is high, the clock frequency is high, therefore noise generated by the PC itself is increased.

Next, the operation of the resource management unit of FIG. 12 will be explained with reference to the flowchart of FIG. 14. The flowchart of FIG. 14, in order to simplify explanation, centers on the operations concerned with external noise, and the operation of FIG. 11 according to temperature conditions can be combined with the operation of the flowchart of FIG. 14.

Figure 11:
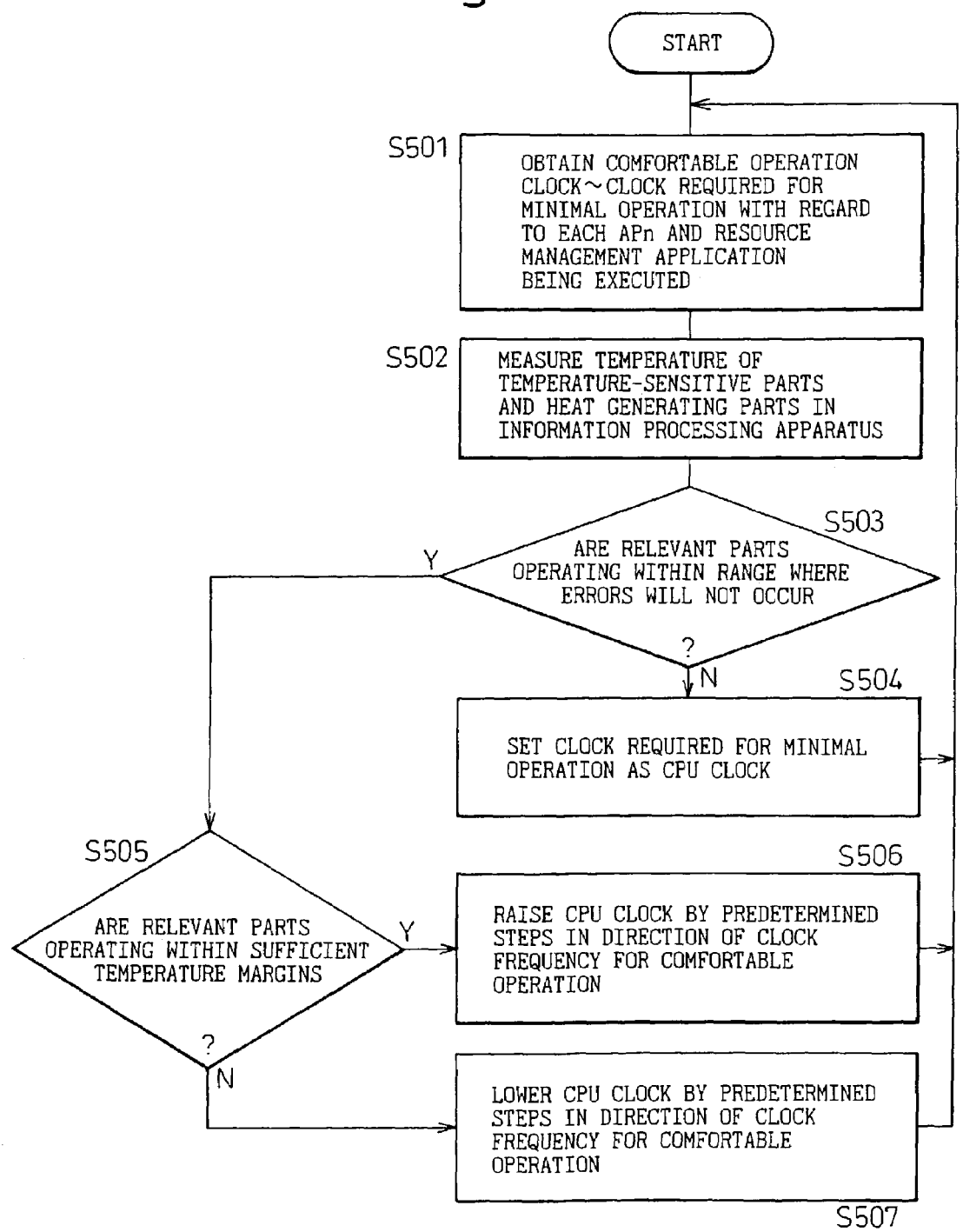
FIG. 11 is a flowchart explaining the operation of the resource management unit shown in FIG. 10.

Firstly, when the applications are started by multitasking, in the same way as step S501 in FIG. 11, the resource management unit 2 obtains comfortable clock frequencies and minimum clock frequencies from the applications APn being run, creates the second management table shown in FIG. 6, and stores them. Then, based on the clock frequencies of each of the applications APn stored in the table, the optimum operation CPU usage rate and minimum operation CPU usage rate of each of the applications APn are obtained (step S601), based on maximum clock frequency obtainable by the PC at that time (300 MHz).

Here, the resource management unit 2 measures the external noise from the PC with the microphone 9 (step S602), and it is determined whether the noise level generated by the PC itself is within a permissible range compared to the measured external noise level (step S603).

If noise level generated by the PC itself is outside of this permissible range (N), this means that the noise generated by the PC itself is louder than the external noise, therefore it is necessary to reduce the system clock frequency of the PC. Consequently, the minimum operation clock frequency is obtained and this clock frequency is set as the system clock (step 604)

On the other hand, if the noise level generated by the PC is within the permissible range (Y) in step S603, this means that the noise generated by the PC itself is quieter than the external noise, therefore it would not be an obstacle to increasing the system clock of the PC. Based on the third management table stored in the memory unit 21, it is determined whether the external noise is higher than the permissible clock frequency during a comfortable operation CPU clock (step S605).

If the external noise is higher than a noise level corresponding to the permissible clock frequency during a comfortable operation CPU clock (Y), the system clock frequency of a comfortable operation clock frequency is obtained and set as the system clock (step S606).

Also, if the external noise is lower than a noise level corresponding to the permissible clock frequency during a comfortable operation CPU clock (N), the permissible CPU clock corresponding to the external noise is obtained and set as the system clock (step S607).

At step 606 or after the operation of step 606, the process returns to step 601 and step 602, and the operation to reset the system clock according to the external noise level is progressed.

In this manner, according to the present embodiment, since the external noise can be measured, therefore, in a range where erroneous operation does not occur, the CPU clock frequency can be changed based on a permissible clock frequency corresponding to application information (clock frequency for comfortable operation and minimum necessary clock frequency) and noise level, according to the external noise, and can provide performance that allows comfortable use of applications even under noisy conditions.

As explained above, according to the present invention, in clock control of an information processing apparatus such as a PC or the like, the clock frequency can be controlled according to requirements from a plurality of applications actually run by multitasking and usage environmental conditions.

Therefore, the CPU clock can be changed within a range where the operator can operate applications comfortably, heat radiation in the information processing apparatus can be suppressed, and stable operation is possible.

Further, the information processing apparatus can check continuously whether the requirements of the applications are being met with regard to performance, therefore the operator can receive an alarm in good time when it is time to upgrade the information processing apparatus, and also be notified of battery cut-off when under power source state conditions.

What is claimed is:

1. A clock control method for setting a determined system clock frequency in an information processing system, comprising:

a step of, when a plurality of applications are running, reading a clock frequency necessary for running of the applications from each of the applications, and registering the clock frequency in each of the plurality of applications;

a step of calculating a CPU usage rate for each application in the information processing system, with respect to a maximum clock frequency obtainable by the information processing system for running each of the plurality of applications, based on each registered clock frequency; and a step of determining a system clock frequency for the information processing system, based on a total sum of calculated CPU usage rates for each application.

2. The clock control method according to claim 1, wherein, when said determined system clock frequency exceeds the maximum clock frequency, a clock frequency excess alarm is sent.

3. The clock control method according to claim 2, wherein, when the number of times that said system clock frequency exceeds the maximum clock frequency increases, said information processing system upgrade necessity alarm is activated.

4. The clock control method according to claim 1, wherein said clock frequency necessary for the running of the applications includes a first clock frequency at which the applications operate comfortably and a second clock frequency that is a minimum necessary for the applications to run, and when said information processing system is operating in a normal state, a first system clock frequency is determined based on the first clock frequency, while when the information processing system is operating in a specified state, a second system clock frequency is determined based on the second clock frequency, any one of the determined first and second system clock frequencies being set in the information processing system according to each state.

5. The clock control method according to claim 4, wherein said specified state is a case where a power source energy in said information processing system changes, and said second system clock frequency is set in the information processing system in place of said first system clock frequency according to a change of a detected remaining power source energy.

6. The clock control method according to claim 5, wherein an operation reservation time for said information processing system is set, and any one selected from among said first system clock frequency and said second system clock frequency is set in the information processing system such that an operation time calculated from the detected remaining power source energy is at least equal to the operation reservation time.

7. The clock control method according to claim 4, wherein the specified state is a case where a temperature in said information processing system changes, said system clock frequency is variable, and the system clock frequency is set in the information processing system, according to a change in a detected temperature.

8. The clock control method according to claim 7, wherein the second system clock frequency is set in said information processing system when the temperature is within a range in which erroneous operation of the information processing system occurs.

9. The clock control method according to claim 7, wherein said system clock frequency is increased by a predetermined width from the second system clock frequency and set as the system clock frequency in said information processing system when the temperature is close to the range in which erroneous operation of the information processing system occurs.

10. The clock control method according to claim 7, wherein said second system clock frequency is decreased by a predetermined width from said first system clock frequency and set as the system clock frequency in said information processing system when the temperature is far from a range in which erroneous operation of the information processing system occurs.

11. The clock control method according to claim 4, wherein the specified state is a case where external noise of said information processing system changes, said system clock frequency is variable, and the system clock frequency is set in the information processing system, according to a change in a detected external noise.

12. The clock control method according to claim 11, wherein, when information processing system noise level is within a permissible range with respect to an external noise level, said second system clock frequency is set in the information processing system.

13. The clock control method according to claim 11, wherein a permissible clock frequency corresponding to a noise level generated from said information processing system is prepared beforehand and, when a measured external noise level is higher than a noise level corresponding to the permissible noise clock frequency, said first system clock frequency is set in the information processing system.

14. The clock control method according to claim 11, wherein a permissible clock frequency corresponding to a noise level generated from said information processing system is prepared beforehand and, when a measured external noise level is lower than a noise level corresponding to the permissible noise clock frequency, the permissible clock frequency corresponding to the external noise level is set in the information processing system.

15. An information processing apparatus that can run a plurality of applications, comprising:

a memory unit which registers clock frequencies necessary for execution, obtained from each application, in each of a plurality of applications; and a control unit which calculates a CPU usage rate of each of the applications for the information processing apparatus with respect to a maximum clock frequency obtainable by the information processing apparatus for running each of the applications, based on each of the clock frequency registered in the memory section, determines a system clock frequency for the information processing apparatus based on a total sum of calculated CPU usage rates for each application, and sets the system clock frequency.

16. The information processing apparatus according to claim 15, wherein said control unit sends a clock frequency excess alarm when the determined system clock frequency exceeds the maximum clock frequency.

17. The information processing apparatus according to claim 16, wherein said control unit sends the information processing system upgrade necessity alarm when the number of times that the system clock frequency exceeds the maximum clock frequency increases.

18. The information processing apparatus according to claim 15, wherein:

said memory unit registers a first clock frequency at which applications can be operated comfortably, and a second clock frequency necessary for minimum operation of the applications, as the clock frequency necessary required for execution of the applications; and said control unit determines a first system clock frequency based on the first clock frequency when the information processing apparatus is operating in a normal state, determines a second system clock frequency based on the second clock frequency when the information processing apparatus is operating in a specific state, and sets any one of the determined first and second system clock frequencies according to each state.

19. The information processing apparatus according to claim 18, wherein said control unit detects a change of the remaining power source energy in the specific state, and sets said second system clock frequency in place of said first system clock frequency according to the detected change.

20. The information processing apparatus according to claim 19, wherein said control unit selects and sets any one of said first system clock frequency and said second system clock frequency, so that an operation time calculated from a detected remaining power source energy is at least equal to a previously set operation reservation time.

21. The information processing apparatus according to claim 18, wherein said control unit measures a temperature inside the information processing apparatus as the specified state, varies the system clock frequency corresponding to the measured temperature, and sets the system clock frequency.

22. The information processing apparatus according to claim 21, wherein said control unit sets said second system clock frequency when the temperature is within a range in which erroneous operation of the information processing system occurs.

23. The information processing apparatus according to claim 21, wherein said control unit increases the system clock frequency by a predetermined width from said second system clock frequency and sets it as the system clock frequency when the temperature is close to the range in which erroneous operation of the information processing system occurs.

24. The information processing apparatus according to claim 21, wherein said control unit decreases said second system clock frequency by a predetermined width from said first system clock frequency and sets it as the system clock frequency when the temperature is far from a range in which erroneous operation of the information processing system occurs.

25. The information processing apparatus according to claim 18, wherein said control unit measures external noise as the specified state, varies the system clock frequency according to a change in the external temperature, and sets the system clock frequency.

26. The information processing apparatus according to claim 25, wherein said control unit sets said second system clock frequency when the noise of the information processing system is within a permissible range with respect to the amount of external noise.

27. The information processing apparatus according to claim 25, wherein a permissible clock frequency corresponding to a noise level generated from the information processing apparatus is registered in said memory unit, and said control unit sets said first system clock frequency when a level of measured external noise is higher than a noise level corresponding the permissible clock frequency.

28. The information processing apparatus according to claim 25, wherein a permissible clock frequency corresponding to a noise level generated from the information processing apparatus is registered in said memory unit, and said control unit sets a permissible clock frequency corresponding to an external noise level when a level of measured external noise is lower than a noise level corresponding the permissible clock frequency.

29. A recording medium for:
when a plurality of applications are running, reading a first clock frequency at which the applications operate comfortably and a second clock frequency that is a minimum necessary for the applications to run, and registering these frequencies for each of the applications;

calculating a CPU usage rate in an information processing system with respect to a maximum clock frequency attainable by the information processing system running the applications, for each of the applications based on the registered clock frequencies; and determining the system clock frequency of the information processing system based on a total sum of calculated CPU usage rates for each of the applications, and recording a program for executing system clock frequency settings.

30. The recording medium according to claim 29, wherein when the determined system clock frequency exceeds the maximum clock frequency, a clock frequency excess alarm is sent.

31. The recording medium according to claim 30, wherein when the number of times that the system clock frequency exceeds the maximum clock frequency increases, an information processing system upgrade necessity alarm is activated.

32. The recording medium according to claim 29, wherein the clock frequency necessary for the running of the applications includes a first clock frequency at which the applications operate comfortably and a second clock frequency that is a minimum necessary for the applications to run, and when said information processing system is operating in a normal state, a first system clock frequency is determined based on the first clock frequency, while when the information processing system is operating in a specified state, a second system clock frequency is determined based on the second clock frequency, any one of the determined first and second system clock frequencies being set in the information processing system according to each state.

33. The recording medium according to claim 32, wherein the specified state is a case where a power source energy in said information processing system changes, and the second system clock frequency is set in the information processing system in place of the first system clock frequency according to a change in a detected remaining power source energy.

34. The recording medium according to claim 33, wherein an operation reservation time for said information processing system is set, and any one selected from among the first system clock frequency and the second system clock frequency is set in the information processing system such that an operation time calculated from the detected remaining power source energy is at least equal to the operation reservation time.

35. The recording medium according to claim 32, wherein said specified state is a case where a temperature in said information processing system changes, the system clock frequency is variable, and said system clock frequency is set in the information processing system, according to a change in a detected temperature.

36. The recording medium according to claim 35, wherein said second system clock frequency is set in said information processing system when the temperature is within a range in which erroneous operation of the information processing system occurs.

37. The recording medium according to claim 35, wherein said system clock frequency is increased by a predetermined width from the second system clock frequency and set as the system clock frequency in said information processing system when the temperature is close to the range in which erroneous operation of the information processing system occurs.

38. The recording medium according to claim 35, wherein said second system clock frequency is decreased by a predetermined width from the first system clock frequency and set as the system clock frequency in said information processing system when the temperature is far from a range in which erroneous operation of the information processing system occurs.

39. The recording medium according to claim 32, wherein said specified state is a case where external noise of said information processing system changes, the system clock frequency is variable, and the system clock frequency is set in the information processing system, according to a change in a detected external noise.

40. The recording medium according to claim 39, wherein, when information processing system noise level is within a permissible range with respect to an external noise level, the second system clock frequency is set in said information processing system.

41. The recording medium according to claim 39, wherein a permissible clock frequency corresponding to a noise level generated from said information processing system is prepared beforehand and, when a measured external noise level is higher than a noise level corresponding to the permissible noise clock frequency, the first system clock frequency is set in the information processing system.

42. The recording medium according to claim 39, wherein a permissible clock frequency corresponding to a noise level generated from said information processing system is prepared beforehand and, when a measured external noise level is lower than a noise level corresponding to the permissible noise clock frequency, the permissible clock frequency corresponding to the external noise level is set in the information processing system.

* * * * *

UNITED STATES PATENT AND TRADEMARK OFFICE
CERTIFICATE OF CORRECTION

| | |
|---|---|
| PATENT NO. | : 7,028,211 B2 |
| APPLICATION NO. | : 10/383228 |
| DATED | : April 11, 2006 |
| INVENTOR(S) | : Tadashi Mantani |

It is certified that error appears in the above-identified patent and that said Letters Patent is hereby corrected as shown below:

On Title Page, (56) References Cited, foreign Patent Documents, column 2, line 9, change "6-190244" to --9-190244--

Signed and Sealed this

Twenty-second Day of August, 2006

JON W. DUDAS
*Director of the United States Patent and Trademark Office*